US010949343B2

(12) United States Patent
Liu et al.

(10) Patent No.: US 10,949,343 B2
(45) Date of Patent: Mar. 16, 2021

(54) INSTANT STORAGE RECLAMATION ENSURING UNINTERRUPTED MEDIA RECORDING

(71) Applicant: International Business Machines Corporation, Armonk, NY (US)

(72) Inventors: Su Liu, Austin, TX (US); Inseok Hwang, Austin, TX (US); Eric Rozner, Austin, TX (US); Kanak B. Agarwal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 15/893,997

(22) Filed: Feb. 12, 2018

(65) Prior Publication Data
US 2019/0251025 A1 Aug. 15, 2019

(51) Int. Cl.
*G06F 12/02* (2006.01)
*G06F 16/22* (2019.01)

(52) U.S. Cl.
CPC .......... *G06F 12/0253* (2013.01); *G06F 16/22* (2019.01)

(58) Field of Classification Search
CPC .............................. G06F 12/0253; G06F 16/22
See application file for complete search history.

(56) References Cited

U.S. PATENT DOCUMENTS

| 7,454,199 | B2 | 11/2008 | Minear et al. |
| 8,340,652 | B2 | 12/2012 | Vitanov et al. |
| 8,463,802 | B2 | 6/2013 | Lin et al. |
| 8,850,140 | B2 | 9/2014 | DeAtley et al. |
| 9,104,686 | B2 | 8/2015 | Jogand-Coulomb et al. |
| 9,146,688 | B2 | 9/2015 | Yang et al. |
| 10,440,538 | B2 * | 10/2019 | Lau .............. G06F 8/61 |
| 2015/0206200 | A1 | 7/2015 | Edmondson et al. |
| 2016/0041816 | A1 * | 2/2016 | Yang ............. G06F 9/4552 717/148 |
| 2016/0142482 | A1 * | 5/2016 | Mehta ............ H04L 67/1095 709/203 |
| 2017/0102929 | A1 * | 4/2017 | Lee .............. G06F 8/61 |

(Continued)

FOREIGN PATENT DOCUMENTS

| CN | 106502783 A | 3/2017 |
| EP | 2077498 A1 | 7/2009 |

OTHER PUBLICATIONS

Yan et al. "Fast App Launching for Mobile Devices using Predictive User Context", MobiSys'12, Jun. 25-29, 2012, © 2012 ACM, pp. 113-126.

(Continued)

*Primary Examiner* — Huawen A Peng
(74) *Attorney, Agent, or Firm* — Gilbert Harmon, Jr.; Jared L. Montanaro (57) ABSTRACT

A processor may initiate a first verification event. The first verification event may be triggered when a mobile device begins generating new data at a first time. The processor may determine, in response to the first verification event, that the mobile device is above a threshold limit of available storage. The processor may analyze one or more applications on the mobile device. The processor may automatically remove a first re-downloadable portion of a first application binary interface associated with a first application from the mobile device. The processor may store the generated new data on the mobile device.

14 Claims, 6 Drawing Sheets

(56) References Cited

U.S. PATENT DOCUMENTS

2018/0203612 A1   7/2018   Kats et al.
2018/0227271 A1*  8/2018   Cartigny ............ H04L 63/0227

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

INSTANT STORAGE RECLAMATION ENSURING UNINTERRUPTED MEDIA RECORDING

BACKGROUND

The present disclosure relates generally to the field of data storage, and more specifically to automatically reclaiming storage while recording media on a mobile device.

While recording an event on a device, it is typical for a device that is low on memory to prematurely terminate or fragment the recording. This leads to multiple instances of a user losing the opportunity to record an irreplaceable, non-replicable moment.

SUMMARY

Embodiments of the present disclosure include a method, system, and computer program product for automatically reclaiming storage while recording media on a mobile device. A processor may initiate a first verification event. The first verification event may be triggered when a mobile device begins generating new data at a first time. The processor may determine, in response to the first verification event, that the mobile device is above a threshold limit of available storage. The processor may analyze one or more applications on the mobile device. The processor may automatically remove a first re-downloadable portion of a first application binary interface associated with a first application from the mobile device. The processor may store the generated new data on the mobile device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of data storage, and more specifically to automatically reclaiming storage while recording media on a mobile device. While the present disclosure is not necessarily limited to such applications, various aspects of the disclosure may be appreciated through a discussion of various examples using this context.

During the course of a day, a user may stumble upon multiple memorable events. The user may desire to record such events; however, the user's mobile device or recording device may not have enough memory to adequately store the recording(s). In order to ensure there will be enough memory to store an entire recording on the user's mobile device, the user may employ a method to automatically remove miscellaneous applications from the mobile device while recording.

In some embodiments, a processor may initiate a first verification event (e.g., identify the storage currently used on a mobile device, the total storage on the mobile device, and the storage remaining on the mobile device). The first verification event may be triggered when a mobile device (e.g., cellphone, smartphone, tablet, computer, etc.) begins generating new data at a first time. The processor may determine, in response to the first verification event, that the mobile device has reached a threshold limit of available storage. In some embodiments, the generation of new data may be a recording and/or associated with a recording.

For example, a user may want to record the user's child taking their first steps. The user may press (e.g., a user interaction with) an icon on the user's smartphone to initiate a recording function and begin recording the child's first steps. While initiating the recording function, a processor in the smartphone may additionally and/or simultaneously identify the prospective storage location of the recording. The processor may identify that the recording will be stored on the smartphone's internal storage. The processor may identify that the internal storage is 32 GB and that 31.50 GB are currently allocated to other recordings and applications. The processor may determine that 31.50 GB of 32 GB of storage is above a threshold limit of 5% available storage.

In some embodiments, any active application may trigger the first verification (or other subsequent verification events). For example, a user may have a work application installed on the user's personal mobile device. The work application may receive data that is needed for the application to function properly and which may be needed for the user to properly utilize the application for work. As such, the mobile device may search its internal storage in order to determine there is enough free storage space on the mobile device to correctly receive and store data associated with the work application.

In some embodiments, the threshold limit of storage may be determined by the processor determining the average storage size of a recording (e.g., 100 MB per minute of recording) and the average length of time a user typically records an event (e.g., 2 minutes, etc.). The processor may then determine that the threshold limit of storage is a percentage of storage that would not allow a current recording to predictively be stored in whole. For example, a user may typically record an event for 3 minutes, with each 3-minute recording being approximately 300 MB. A processor on a tablet may determine that the tablet has 16 GB of memory and that the threshold limit for a recording is 15.71 GB (i.e., 98.2% storage of 16 GB used). In some embodiments, the user may determine the threshold limit of storage by selecting a percentage or gross amount of available storage that the user desires not to exceed with a recording.

In some embodiments, if the processor has determined that a mobile device has reached a threshold limit of available storage in one area, the processor may analyze a different storage location. For example, if a mobile device has expandable memory, the processor may determine that the internal storage is above a threshold level of storage and then the processor may analyze the expandable memory card in the mobile device. The processor may then determine if the expandable memory card is above the threshold level of storage.

In some embodiments, the processor may analyze one or more applications on the mobile device. The processor may automatically remove a first re-downloadable portion of a first application binary interface (e.g., or compiled object code, entries for the application in a master file table, etc.) associated with a first application from the mobile device. In some embodiments, the processor may store the generated new data (e.g., recording) on the mobile device.

For example, a user may begin recording an event on a mobile device. The mobile device may identify from historical data that the user typically records an event for 2 minutes, which will typically use 30 MB of storage. The mobile device may determine that only 20 MB of storage are left on the internal storage of the mobile device. The mobile device may then analyze each application on the mobile device (e.g., gaming applications, social media applications, etc.). The mobile device may then automatically remove a re-downloadable portion of an application binary interface (ABI) associated with one of the applications. The mobile device may then store the recording on the internal storage after removing the ABI and ensuring there is enough storage space for the entirety of the recording. In some embodiments, the ABI of an application may be the static data associated with the application (e.g., the data needed to originally install the application and/or the data that is re-downloadable and accessible to the processor).

In some embodiments, the processor may analyze the one or more applications on the mobile device by accessing an application database (e.g., a database generated by the processor that houses the installed one or more applications as native code on a mobile device). In some embodiments, the application database may include the one or more applications. The processor may identify the storage size of each of the one or more applications. In another embodiment, the processor may scan a file system in order to acquire the storage size of each of the one or more applications. In some embodiments, the storage size may include respective application binary interfaces for each of the one or more applications. The processor may rank each of the one or more applications.

For example, a tablet may scan its internal storage for a database that contains each application installed on the tablet. The database may display the amount of storage needed for the application to be installed after being compiled in the tablet's native code language (e.g., machine codes, sequences of binary numbers, etc.), and the tablet may rank the applications based on the amount of storage needed for the application to be installed. In some embodiments, the tablet (e.g., mobile device, processor, etc.) may identify the storage size of each of the one or more applications without use of the application database. For example, the tablet may be designed to automatically identify storage size of any application installed or queued to be installed on the tablet by predicting the compiled binary size of the application(s).

In some embodiments, the processor may rank each of the one or more applications by identifying the frequency of which the one or more applications have been accessed (e.g., using a least frequently used algorithm). The processor may identify the recency with which each of the one or more applications has been accessed (e.g., using a least recently used algorithm). The processor may tag each of the one or more applications with a respective indicator that indicates the respective storage size, frequency of use, and recency of access for each of the one or more applications.

For example, a smartphone may analyze three applications installed on the smartphone. The smartphone may access historical data associated with each of the applications and identify the last time each application was accessed; the first application last accessed in January, the second application last accessed in February, and the third application last accessed in March. The smartphone may additionally identify how many times each application has been used; the first application used 20 times, the second application used 15 times, and the third application being used 10 times. The smartphone may further identify the storage size of each of the applications; the first application having a storage size of 20 MB, the second application having a storage size of 10 MB, and the third application having a storage size of 2 MB.

The smartphone may generate a tag for the first application with its respective three metrics (e.g., last used in January, accessed 20 times, and having a storage size of 20 MB), a second tag for the second application with its respective three metrics, and a third tag for the third application with its respective three metrics. The smartphone may analyze each tag and rank the three applications. In some embodiments, the smartphone may rank the applications depending on one metric. For example, ranking the applications based on storage size so that the application with the largest storage size (e.g., the first application) is ranked last and is removed first.

In some embodiments, the smartphone may rank the applications based on any combination of two or more of the metrics. For example, although the first application has the largest storage size, it may be ranked above the third application because the first application has been used more often (e.g., 20 times compared to the third application's 10 times). That is, the rank of the applications may include a weighting of the metrics, with one metric having a greater or lesser effect on the ranking.

In another example, the first application may have been accessed 20 times over the application's 90-day life since installation, or once every 4.5 days. However, the third application may have been accessed 10 times over the applications 30-day life since installation, or once every 3 days. That is, the rank of the applications may include determining the overall access events (e.g., uses of) an application over a period of time and determining which is accessed more often over the period of time. Without the standardization, it would appear to the smartphone that the first application was accessed more times because of the total accesses over the first application's longer lifespan than that of the third application.

In some embodiments, the processor may identify, from a first tag, that the first application has the largest storage size of the one or more applications, the lowest frequency of use of the one or more applications, and the oldest recency of access of the one or more applications. The processor may rank the first application the lowest among the one or more applications. In some embodiments, the lowest rank may flag (e.g., indicate, designate, etc.) the first application for removal from the mobile device.

In some embodiments, the processor may identify, from a second tag, that a second application has the lowest storage size of the one or more applications, the highest frequency of use of the one or more applications, and the newest recency of access of the one or more applications. The processor may rank the second application the highest among the one or more applications. In some embodiments, the highest rank may prevent the second application from being removed from the mobile device.

In some embodiments, the processor may rank the one or more applications in order to generate and store a queue of which applications should be removed in the event that storage space on a mobile device is needed to be reallocated for a recording. The stored queue may prevent the processor from having to reanalyze each application every time a new recording is initiated.

In some embodiments, the processor may initiate a second verification event during the generating of new data (e.g., during the recording). In some embodiments, the second verification event is at a second time that is subsequent to the first verification event. The processor may determine, in response to the second verification event, that the mobile device is above the threshold limit of available storage. The processor may automatically remove a third re-downloadable portion of a third application binary interface associated with a third application from the mobile device. In some embodiments, the third application may be ranked as the lowest among the one or more applications after removal of the first application.

For example, a user may begin recording an event on a camera. The camera may determine that the user typically records events that require 1 GB of storage. The camera may determine that there is only 0.9 GB of storage left on the camera (e.g., the camera is above a threshold limit of available storage) and delete a first application that has been previously ranked as the application least likely to affect the camera upon removal.

The camera may then reanalyze the storage left on the camera and determine that there is 0.99 GB of storage left. The camera may then delete another application that has been previously ranked, but has moved to the lowest rank with the removal of the first application. In some embodiments, the camera (e.g., processor, mobile device, etc.) may delete a bulk number of applications (or re-downloadable portions of application binary interfaces) at once (e.g., simultaneously) in order to reallocate the required amount of storage needed to store the recording.

In some embodiments, the verification events may be the same, constant verification event. For example, upon being initiated by a processor in response to a recording, the processor may determine the threshold amount of storage needed in real-time and constantly monitor used and available storage. The processor may only remove applications at the moment that storage is needed. There may be no removal of applications and/or reallocation of storage until the exact time in which the storage is needed to store the recording.

In some embodiments, the processor may identify that the mobile device has stopped the generating of new data (e.g., stopped the recording). The processor may initiate a third verification event. In some embodiments, the third verification event may be trigged when a user interacts with an icon associated with the first application. The processor may identify, from the first tag, the storage size of the first re-downloadable portion of the first binary interface associated with the first application. The processor may determine, in response to the third verification event, that the mobile device will be above the threshold limit of available storage upon installing the first re-downloadable portion of the first application binary interface. The processor may automatically remove a fourth re-downloadable portion of a fourth application binary interface (ABI) associated with a fourth application from the mobile device. In some embodiments, the fourth application was ranked as the lowest among the one or more applications after removal of the third application and after the interaction with the icon associated with the first application. The processor may then automatically (re)install the first re-downloadable portion of the application binary interface associated with the first application on the mobile device. In some embodiments, the first re-downloadable portion of the first application binary interface may be associated with the dynamic data of the first application that remain in the device (e.g., user preferences, gaming achievements, etc.).

For example, a laptop may have removed a re-downloadable portion of an ABI of an application in order to properly store a recording. When removing the ABI, the laptop may have kept the dynamic data and the icon associated with the application. Keeping the dynamic data associated with the application can allow the application to be reinstalled (e.g., re-downloaded from an application store, etc.) without the user performing specific actions again (e.g., earning a specific achievement on a game, etc.) and/or inputting personal information again (e.g., user account information, etc.). Keeping the icon associated with the application may allow the user to continue to have access to the application and remember the existence of the application.

Continuing with the example above, the laptop may identify that the recording has stopped and that no more storage space is required for the recording. The user may then try to access the removed application by clicking on the applications desktop icon. The laptop may identify that there is not enough storage space to reinstall the ABI of the application and remove another application's ABI in order to secure room for the reinstallation of the removed application.

In some embodiments, the processor may cycle applications to be removed and reinstalled until it is indicated that more storage space is obtained (e.g., the recording is moved to another device, storage space is increases on the mobile device, etc.). For example, the processor may have tagged one application that uses 200 MB of storage and that is accessed once a week as being the first application to be removed. Additionally, the processor may have tagged a second application that uses 100 MB of storage and that is accessed twice a week, and another application that uses 100 MB of storage and that is accessed five times a week to be removed. That is, the processor may weight the recency of use in order to determine which application to delete at a certain time.

In some embodiments, the applications may be removed and/or reinstalled automatically without alerting the user to the removal and/or reinstallation. In some embodiments, the user may be alerted to the removal and/or reinstallation. In other embodiments, the processor may randomly (or at particular time intervals) analyze the storage space available on the mobile device and if there is enough space for a removed application, the processor may automatically reinstall the application.

In some embodiments, the processor may generate a list of applications and/or flag applications that are exempt from removal. In some embodiments, the list of applications may be provided by user and/or based on historical data. For example, historical data may show that the application is used multiple times a day by the user. In other embodiments, the list of applications may be applications that are flagged as necessary to operate the mobile device and/or application creating data (e.g., the camera application, etc.).

In some embodiments, an application may not have been removed and therefore cannot be reinstalled, but is instead being installed onto the mobile device for the first time. The processor may then follow the same sequence of actions discussed above, and if there is not enough storage space available to install the application, the processor may delete the ABI of an application already installed on the mobile device.

Figure 1:
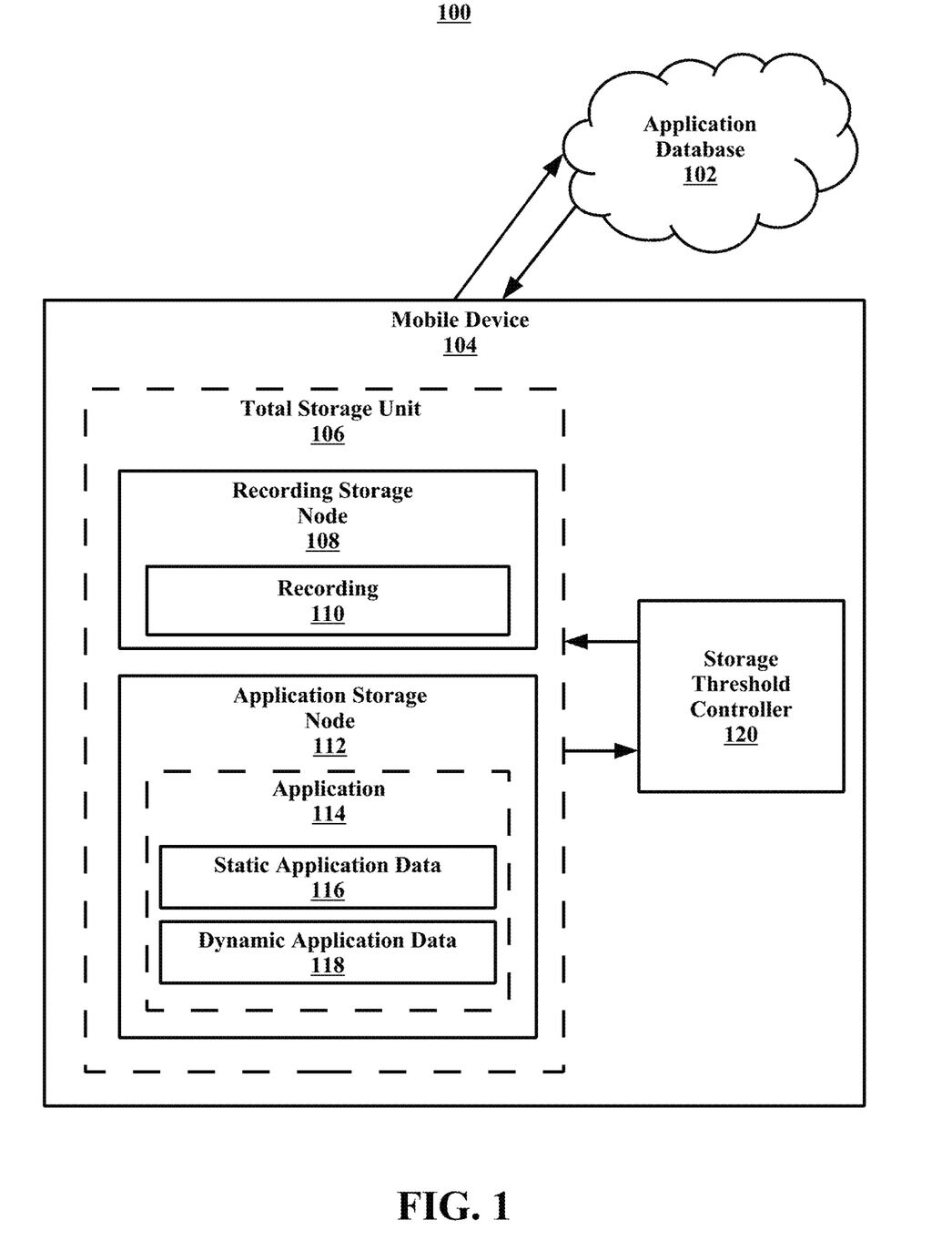
FIG. 1 illustrates a functional block diagram of an example system for automatically reclaiming storage on a mobile device, in accordance with embodiments of the present disclosure.

Referring now to FIG. 1, illustrated is a functional block diagram of an example system 100 for automatically reclaiming storage on a mobile device, in accordance with embodiments of the present disclosure. In some embodiments, the system 100 includes an application database 102 and a mobile device 104. In some embodiments, the mobile device includes total storage unit 106 and storage threshold controller 120.

In some embodiments, the total storage unit 106 includes a recording storage node 108 and an application storage node 112. Total storage unit 108 includes a recording 110 and application storage node 112 includes an application 114, which includes static application data 116 (e.g., re-downloadable portions of one or more application binary interfaces associated with respective applications) and dynamic application data 118 (e.g., non-re-downloadable portions of one or more application binary interfaces associated with respective applications).

In some embodiments, the mobile device 104 begins a recording 110 of an event and the mobile device 104 accesses the total storage unit 106. Upon accessing the total storage unit 106, the mobile device 104 identifies from the recording storage node 108 and the application storage node 112, how much storage is utilizable in the mobile device.

The mobile device then accesses the storage threshold controller 120, which uses the information gathered from the total storage unit 106 to determine a threshold limit of available storage. The storage threshold controller 120 determines that there is not enough available storage to properly store the recording 110 and notifies the mobile device of the pending threshold violation.

The mobile device 104 then communicates and accesses the application database 102 and analyzes all of the applications installed on the mobile device 104. In some embodiments, the application database 102 is an internal storage node in the mobile device 104. The mobile device 104 analyzes and ranks each of the installed applications listed in the application database 102. Upon ranking the installed applications, which are on the mobile device 104, the mobile device 104 scans the application storage node 112 for the lowest ranked application, which may be, for example, application 114.

The mobile device 104, then removes the static application data 116 (e.g., binary data, ABI, etc.) from the application storage node 112, and leaves the dynamic application data 118 (e.g., user information, system preferences, etc.). The mobile device 104 then stores the entirely of recording 110. In some embodiments, the recording storage node 108 and the application storage node 112 in the total storage unit 106 are not dedicated storage nodes, as depicted, and are interchangeable for both the use of application storage and/or recording storage on the mobile device 104.

Figure 2:
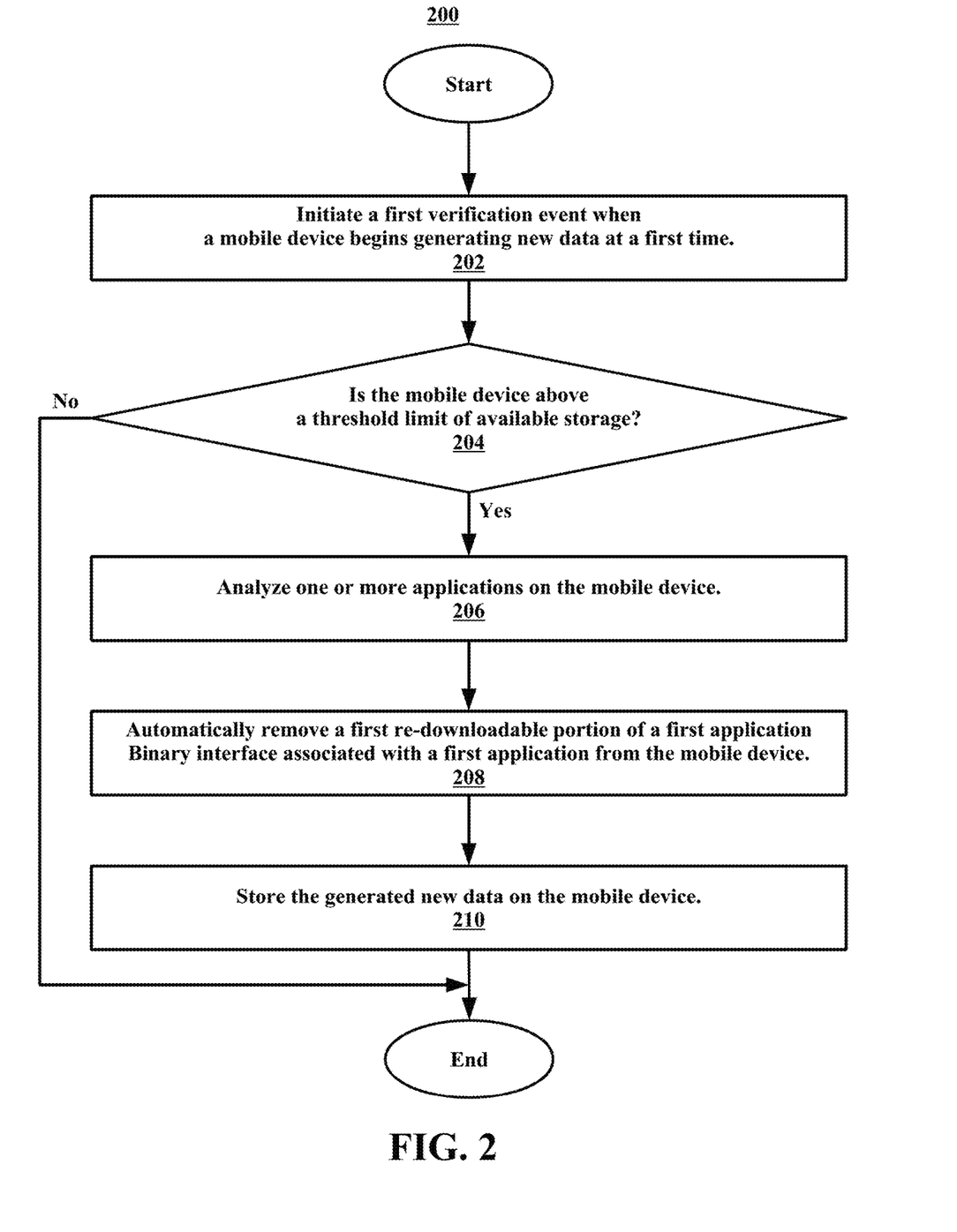
FIG. 2 illustrates a flowchart of an example method for automatically removing an application binary interface from a mobile device in order to store generated new data, in accordance with embodiments of the present disclosure.

Referring now to FIG. 2, illustrated is a flowchart of an example method 200 for automatically removing an application binary interface from a mobile device in order to store a recording, in accordance with embodiments of the present disclosure. In some embodiments, a processor may perform the method 200. In some embodiments, the method 200 begins at operation 202. At operation 202, a processor initiates a first verification event when a mobile device begins generating new data at a first time.

After operation 202, the method 200 proceeds to decision block 204, where the processor determines, from the first verification event, whether or not the mobile device is above a threshold limit of available storage. If, at decision block 204, it is determined that the mobile device is not above (e.g., below) the threshold limit of available storage, the method 200 ends.

If, at decision block 204, it is determined that the mobile device is above the threshold limit of available storage, the method 200 proceeds to operation 206. At operation 206, the processor analyzes one or more applications on the mobile device. In some embodiments, the processor may analyze (e.g., using least frequently used, least recently used algorithms, etc.) the one or more applications in order to rank the applications. After operation 206, the method 200 proceeds to operation 208, where the processor automatically removes a first re-downloadable portion of a first application binary interface associated with a first application from the mobile device.

After operation 208, the method 200 proceeds to operation 210. At operation 210, the processor stores the generated new data on the mobile device. After operation 210, the method 200 ends.

Figure 3:
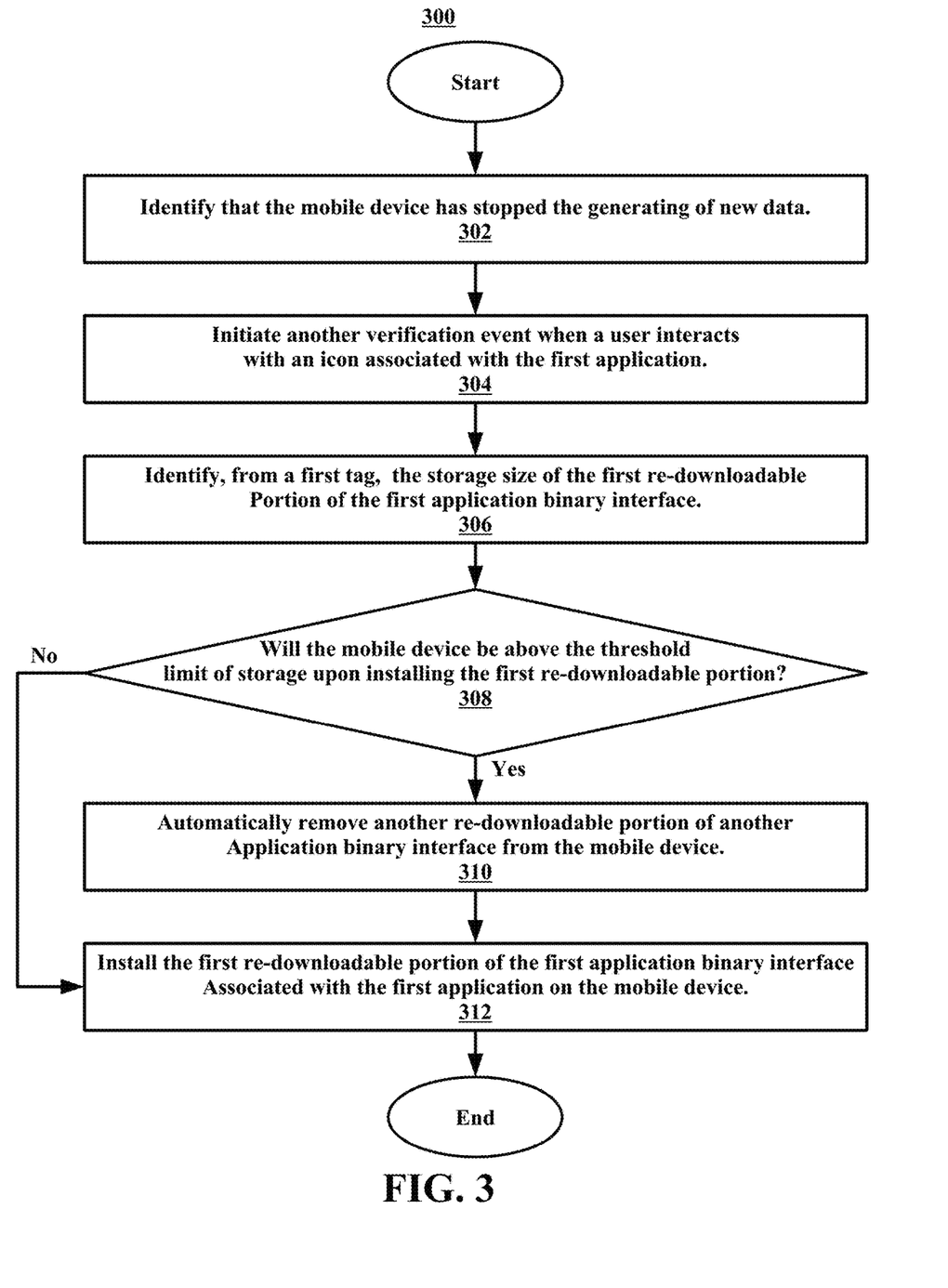
FIG. 3 illustrates a flowchart of an example method for automatically reinstalling a previously removed application to a mobile device, in accordance with embodiments of the present disclosure.

Referring now to FIG. 3, illustrated is a flowchart of an example method 300 for automatically reinstalling a previously removed application to a mobile device, in accordance with embodiments of the present disclosure. In some embodiments, a processor may perform the method 300. In some embodiments, the method 300 may be a continuation of the method 200 and/or performed by the same or similar processor as discussed above in regard to the method 200 of FIG. 2.

In some embodiments, the method 300 begins at operation 302. At operation 302, the processor identifies that the mobile device has stopped the generating of new data. After operation 302, the method 300 proceeds to operation 304, where the processor initiates another (e.g., subsequent, second, third, fourth, etc.) verification event when a user interacts with an icon associated with the first application. In some embodiments, the processor may automatically initiate another verification event after a user clears space (e.g., removes a recording, removes other applications, backs-up information on another device) on the mobile device.

After operation 304, the method 300 proceeds to operation 306. At operation 306, the processor identifies, from a first tag, the storage size of the first re-downloadable portion of the first application binary interface further associated with the first application. After operation 306, the method 300 proceeds to decision block 308, where the processor determines if the mobile device will be above the threshold limit of available storage upon (re)installing the first re-downloadable portion of the first application binary interface.

If, at decision block 308, it is determined that the mobile device will not be above (e.g., below) the threshold limit of available storage upon (re)installing the first application, the method 300 may automatically proceed to operation 312, which will be discussed further below. If, however, at decision block 308, it is determined that the mobile device will be above the threshold limit of available storage upon (re)installing the first re-downloadable portion of the first application binary interface, the method 300 proceeds to operation 310.

At operation 310, the processor automatically removes another re-downloadable portion of another application binary interface associated with another application from the mobile device. After operation 310, the method 300 proceeds to operation 312. At operation 312, the processor (re)installs the first re-downloadable portion of the first application binary interface associated with the first application on the mobile device. After operation 312, the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
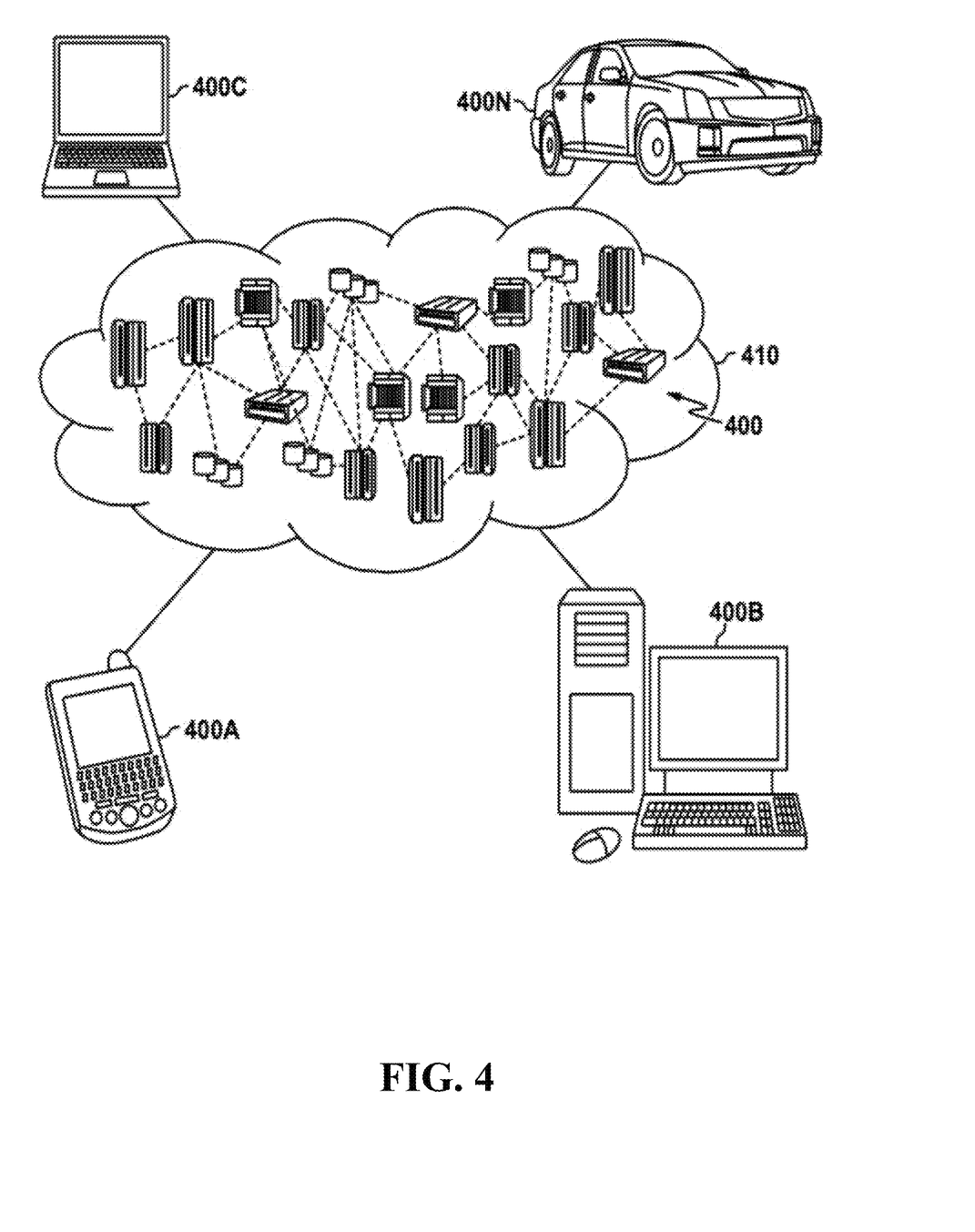
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
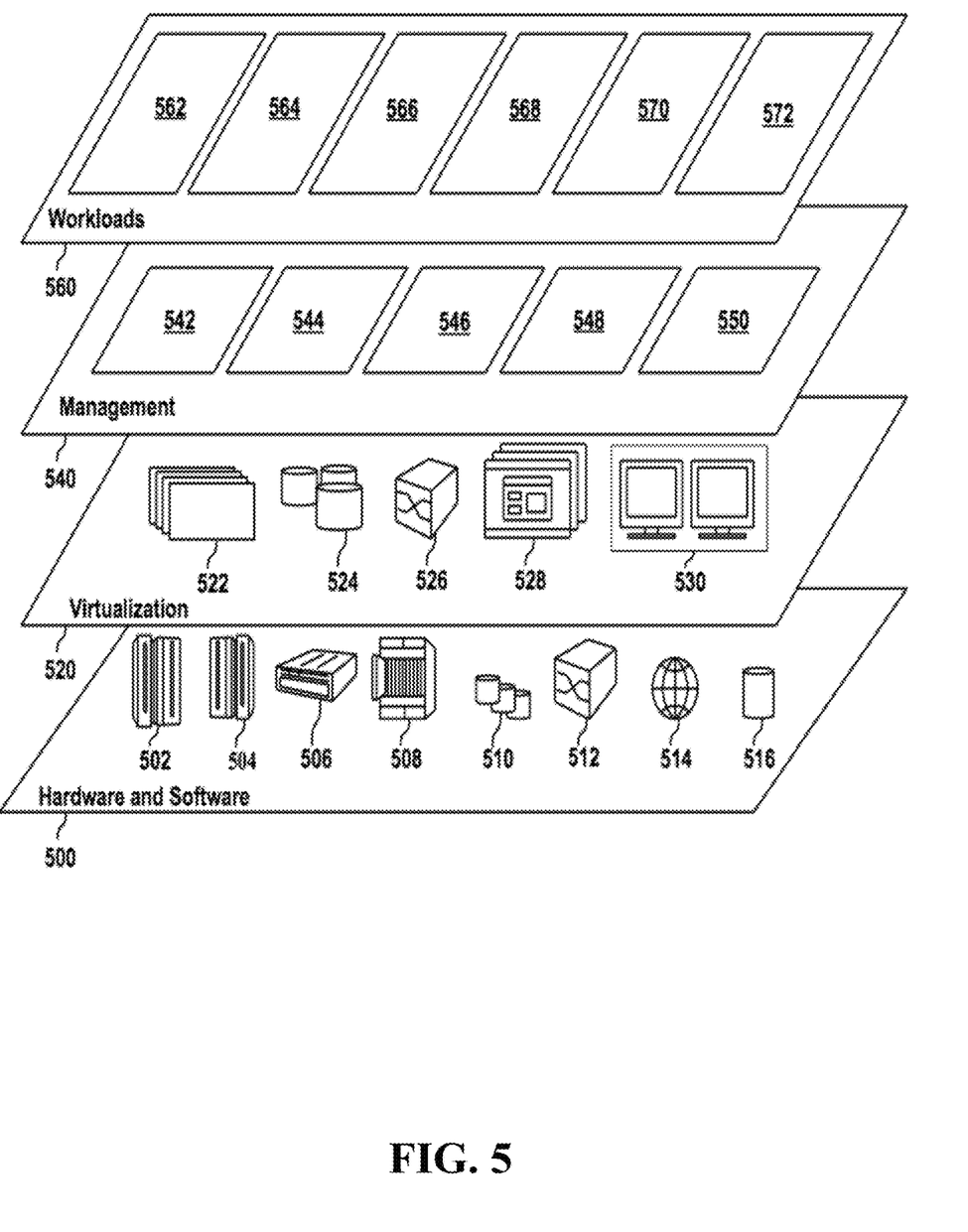
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and removing an application binary interface from a mobile device 572.

Figure 6:
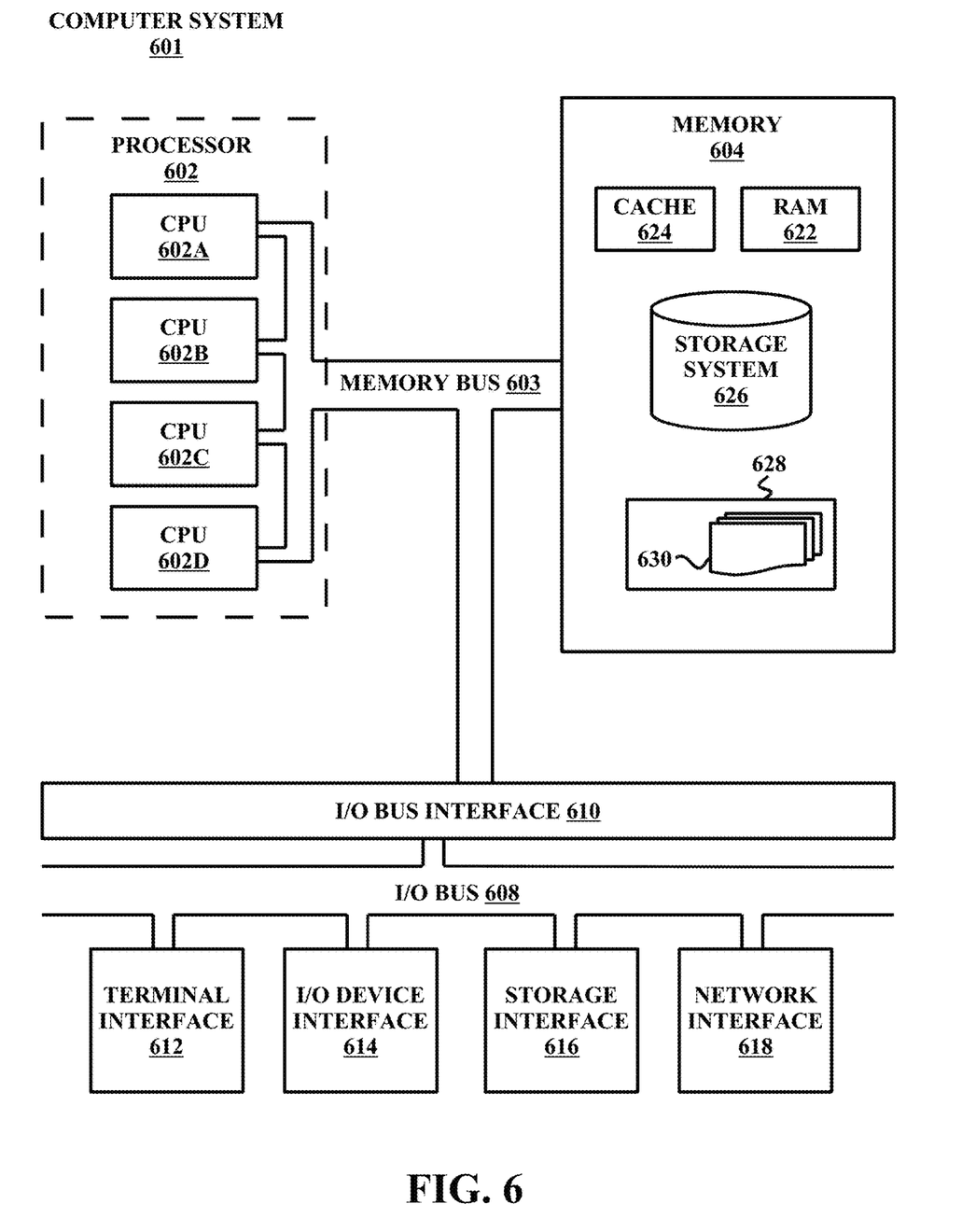
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
    initiating, by a processor, a first verification event, wherein the first verification event is triggered when a mobile device begins generating new data at a first time;
    determining, in response to the first verification event, that the mobile device is above a threshold limit of available storage;
    analyzing one or more applications on the mobile device based at least on accessing an application database comprising the one or more applications, predicting compiled binary sizes of the one or more applications, identifying the storage size of the one or more applications wherein the storage size comprises application binary interfaces for the one or more applications and ranking the one or more applications, wherein the ranking is based on weighted metrics comprising:
        identifying the frequency of which the one or more applications has been accessed;
        identifying the recency with which the one or more applications has been accessed; and tagging the one or more applications with a respective indicator that indicates the respective storage size, frequency of use, and recency of access of the one or more applications; and
    removing, automatically, a first re-downloadable portion of a first application binary interface associated with a first application from the mobile device based on the analyzing; and
    storing the generated new data on the mobile device.

2. The method of claim 1, further comprising:
    identifying, from a first tag, that the first application has the largest storage size of the one or more applications, the lowest frequency of use of the one or more applications, and the oldest recency of access of the one or more applications; and
    ranking the first application the lowest among the one or more applications, wherein the lowest rank flags the application for removal from the mobile device.

3. The method of claim 2, further comprising:
    identifying, from a second tag, that a second application has the lowest storage size of the one or more applications, the highest frequency of use of the one or more applications, and the newest recency of access of the one or more applications; and
    ranking the second application the highest among the one or more applications, wherein the highest rank prevents the application from being removed from the mobile device.

4. The method of claim 3, further comprising:
    initiating a second verification event during the generating of new data, wherein the second verification event is at a second time that is subsequent to the first verification event;
    determining, in response to the second verification event, that the mobile device is above the threshold limit of available storage; and
    removing, automatically, a third re-downloadable portion of a third application binary interface associated with a third application from the mobile device, wherein the third application was ranked as the lowest among the one or more applications after removal of the first application.

5. The method of claim 4, further comprising:
    identifying that the mobile device has stopped the generating of new data;
    initiating a third verification event, wherein the third verification event is triggered when a user interacts with an icon associated with the first application;
    identifying, from the first tag, the storage size of the first re-downloadable portion of the first application binary interface associated with the first application;
    determining, in response to the third verification event, that the mobile device will be above the threshold limit of available storage upon installing the first re-downloadable portion of the first application binary interface;
    removing, automatically, a fourth re-downloadable portion of a fourth application binary interface associated with a fourth application from the mobile device, wherein the fourth application was ranked as the lowest among the one or more applications after removal of the third application and after the interaction with the icon associated with the first application; and
    installing the first re-downloadable portion of the application binary interface associated with the first application on the mobile device, wherein the first re-downloadable portion of the first application binary interface is associated with dynamic data of the first application.

6. A system comprising:
    a memory; and
    a processor in communication with the memory, the processor being configured to perform operations comprising:
    initiating, by a processor, a first verification event, wherein the first verification event is triggered when a mobile device begins generating new data at a first time;

determining, in response to the first verification event, that the mobile device is above a threshold limit of available storage;

analyzing one or more applications on the mobile device based at least on accessing an application database comprising the one or more applications, predicting compiled binary sizes of the one or more applications, identifying the storage size of each of the one or more applications wherein the storage size comprises application binary interfaces for the one or more applications and ranking each of the one or more applications, wherein the ranking is based on weighted metrics comprising:

identifying the frequency of which the one or more applications has been accessed;

identifying the recency with which the one or more applications has been accessed; and tagging the one or more applications with a respective indicator that indicates the respective storage size, frequency of use, and recency of access of the one or more applications; and removing, automatically, a first re-downloadable portion of a first application binary interface associated with a first application from the mobile device based on the analyzing; and storing the generated new data on the mobile device.

7. The system of claim 6, further comprising:
identifying, from a first tag, that the first application has the largest storage size of the one or more applications, the lowest frequency of use of the one or more applications, and the oldest recency of access of the one or more applications; and ranking the first application the lowest among the one or more applications, wherein the lowest rank flags the application for removal from the mobile device.

8. The system of claim 7, further comprising:
identifying, from a second tag, that a second application has the lowest storage size of the one or more applications, the highest frequency of use of the one or more applications, and the newest recency of access of the one or more applications; and ranking the second application the highest among the one or more applications, wherein the highest rank prevents the application from being removed from the mobile device.

9. The system of claim 8, further comprising:
initiating a second verification event during the generating of new data, wherein the second verification event is at a second time that is subsequent to the first verification event;

determining, in response to the second verification event, that the mobile device is above the threshold limit of available storage; and removing, automatically, a third re-downloadable portion of a third application binary interface associated with a third application from the mobile device, wherein the third application was ranked as the lowest among the one or more applications after removal of the first application.

10. The system of claim 9, further comprising:
identifying that the mobile device has stopped the generating of new data;

initiating a third verification event, wherein the third verification event is triggered when a user interacts with an icon associated with the first application;

identifying, from the first tag, the storage size of the first re-downloadable portion of the first application binary interface associated with the first application;

determining, in response to the third verification event, that the mobile device will be above the threshold limit of available storage upon installing the first re-downloadable portion of the first application binary interface;

removing, automatically, a fourth re-downloadable portion of a fourth application binary interface associated with a fourth application from the mobile device, wherein the fourth application was ranked as the lowest among the one or more applications after removal of the third application and after the interaction with the icon associated with the first application; and installing the first re-downloadable portion of the application binary interface associated with the first application on the mobile device, wherein the first re-downloadable portion of the first application binary interface is associated with dynamic data of the first application.

11. A computer program product comprising a computer readable storage medium having program instructions embodied therewith, the program instructions executable by a processor to cause the processor to perform a method, the method comprising:

initiating, by a processor, a first verification event, wherein the first verification event is triggered when a mobile device begins generating new data at a first time;

determining, in response to the first verification event, that the mobile device is above a threshold limit of available storage;

analyzing one or more applications on the mobile device based at least on accessing an application database comprising the one or more applications, predicting compiled binary sizes of the one or more applications, identifying the storage size of each of the one or more applications wherein the storage size comprises application binary interfaces for the one or more applications and ranking each of the one or more applications, wherein the ranking is based on weighted metrics comprising:

identifying the frequency of which the one or more applications has been accessed;

identifying the recency with which the one or more applications has been accessed; and tagging the one or more applications with a respective indicator that indicates the respective storage size, frequency of use, and recency of access of the one or more applications; and removing, automatically, a first re-downloadable portion of a first application binary interface associated with a first application from the mobile device based on the analyzing; and storing the generated new data on the mobile device.

12. The computer program product of claim 11, further comprising:

identifying, from a first tag, that the first application has the largest storage size of the one or more applications, the lowest frequency of use of the one or more applications, and the oldest recency of access of the one or more applications; and ranking the first application the lowest among the one or more applications, wherein the lowest rank flags the application for removal from the mobile device.

13. The computer program product of claim 12, further comprising:
  identifying, from a second tag, that a second application has the lowest storage size of the one or more applications, the highest frequency of use of the one or more applications, and the newest recency of access of the one or more applications; and
  ranking the second application the highest among the one or more applications, wherein the highest rank prevents the application from being removed from the mobile device.

14. The computer program product of claim 13, further comprising:
  initiating a second verification event during the generating of new data, wherein the second verification event is at a second time that is subsequent to the first verification event;
  determining, in response to the second verification event, that the mobile device is above the threshold limit of available storage;
  removing, automatically, a third re-downloadable portion of a third application binary interface associated with a third application from the mobile device, wherein the third application was ranked as the lowest among the one or more applications after removal of the first application;
  identifying that the mobile device has stopped the generating of new data;
  initiating a third verification event, wherein the third verification event is triggered when a user interacts with an icon associated with the first application;
  identifying, from the first tag, the storage size of the first re-downloadable portion of the first application binary interface associated with the first application;
  determining, in response to the third verification event, that the mobile device will be above the threshold limit of available storage upon installing the first re-downloadable portion of the first application binary interface;
  removing, automatically, a fourth re-downloadable portion of a fourth application binary interface associated with a fourth application from the mobile device, wherein the fourth application was ranked as the lowest among the one or more applications after removal of the third application and after the interaction with the icon associated with the first application and
  installing the first re-downloadable portion of the application binary interface associated with the first application on the mobile device, wherein the first re-downloadable portion of the first application binary interface is associated with dynamic data of the first application.

* * * * *